United States Patent [19]
Takahashi et al.

[11] Patent Number: 5,627,941
[45] Date of Patent: May 6, 1997

[54] METHOD OF CONFIGURING A NEURAL NETWORK AND A DIAGNOSIS/CONTROL SYSTEM USING THE NEURAL NETWORK

[75] Inventors: Isao Takahashi; Fumihiro Endo; Tokio Yamagiwa, all of Hitachi, Japan

[73] Assignee: Hitachi, Ltd., Tokyo, Japan

[21] Appl. No.: 111,472

[22] Filed: Aug. 25, 1993

[30] Foreign Application Priority Data

| Aug. 28, 1992 | [JP] | Japan | 4-230208 |
| Aug. 31, 1992 | [JP] | Japan | 4-230859 |

[51] Int. Cl.⁶ .................................................. G06F 15/18
[52] U.S. Cl. .............................. 395/22; 395/23; 395/24
[58] Field of Search .................................. 395/23, 24, 22

[56] References Cited

U.S. PATENT DOCUMENTS

| 5,060,278 | 10/1991 | Fukumizu | 395/22 |
| 5,091,864 | 2/1992 | Baji et al. | 395/27 |
| 5,129,039 | 7/1992 | Hiraiwa | 395/24 |
| 5,146,541 | 9/1992 | Speidel | 395/24 |
| 5,155,801 | 10/1992 | Lincoln | 395/22 |
| 5,195,171 | 3/1993 | Takatori et al. | 395/27 |
| 5,216,463 | 6/1993 | Morita | 395/23 |
| 5,222,194 | 6/1993 | Nishimura | 395/23 |
| 5,255,347 | 10/1993 | Matsuba et al. | 395/22 |
| 5,287,533 | 2/1994 | Kamiya | 395/23 |
| 5,295,227 | 3/1994 | Yokono | 395/22 |
| 5,355,434 | 10/1994 | Yoneda et al. | 395/23 |

FOREIGN PATENT DOCUMENTS

| 2-81161 | 3/1990 | Japan . |
| 2-100757 | 4/1990 | Japan . |
| 2-170263 | 7/1990 | Japan . |
| 2-272326 | 11/1990 | Japan . |
| 2-297074 | 12/1990 | Japan . |
| 2-296161 | 12/1990 | Japan . |
| 3-201158 | 9/1991 | Japan . |
| 3-201160 | 9/1991 | Japan . |
| 3-210686 | 9/1991 | Japan . |
| 3-238370 | 10/1991 | Japan . |
| 3-250243 | 11/1991 | Japan . |
| 3-286388 | 12/1991 | Japan . |

OTHER PUBLICATIONS

"A Module Neural Network Application to GIS Preventive Maintenance System", H. Ogi et al, pp. 339–344.

"Development of the Detective and Diagnostic Techniques of Partial Discharge in GIS", M. Oyama, et al, pp. 321–326.

Primary Examiner—George B. Davis
Attorney, Agent, or Firm—Antonelli, Terry, Stout & Kraus, LLP

[57] ABSTRACT

The number of hidden layers is no larger than 2 and a sum is determined for each case. A relationship between the sum of the inputs and teaching data for each case is expressed in a table in a descending order of the sum of inputs for each output of an output layer, and the teacher data for the maximum sum and the number of times of change in the teacher data are considered. A configuration (the number of hidden layers and the number of neurons thereof) is determined based on those data, and the coupling weights can be analytically calculated by using the table. Where the number of times of change of the teacher data is odd, some inputs do not route a second hidden layer.

23 Claims, 15 Drawing Sheets

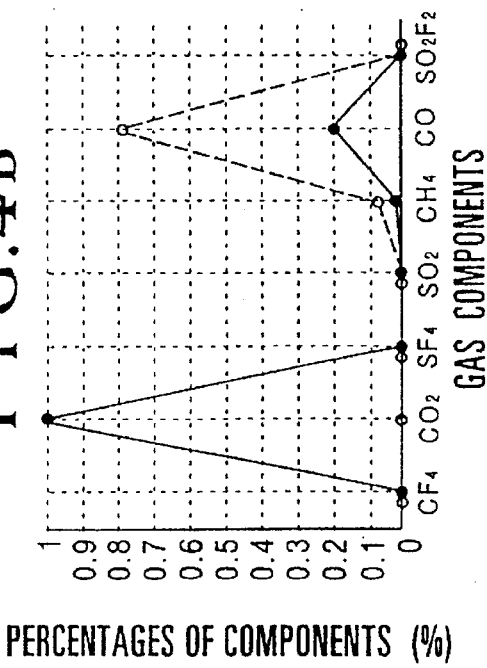

INPUT AFTER
CONVERSION OF NUMBER
OF INPUT DATA

OUTPUT

INPUT LAYER     HIDDEN LAYERS     OUTPUT LAYER

NUMBER N OF TIMES OF LEARNING ⟶

INPUT LAYER     HIDDEN LAYERS     OUTPUT LAYER

METHOD OF CONFIGURING A NEURAL NETWORK AND A DIAGNOSIS/CONTROL SYSTEM USING THE NEURAL NETWORK

BACKGROUND OF THE INVENTION

1. Field of the Invention

The present invention relates to a novel method for configuring a neural network and a neural network diagnosis/control system which uses the neural network.

2. Description of the Related Art

In diagnosis of electric power equipment, various measurements for various types of equipment are analyzed by experts of the arts to determine whether the equipment is normal or not. If it is determined to be abnormal, a most probable cause is inferred. For example, in JP-A-2-297074, a diagnosis method using a neural network is proposed. In the method, past status of various types of equipment are previously learned by a neural network having a multi-layer structure. When new status of the equipment is input, whether or not equipment is normal is determined based on the learn result. If equipment is determined to be abnormal, a cause therefor is inferred.

In JP-A-2-272326, detailed description is made on mechanical vibration, acoustic vibration and electric oscillation of a rotary machine.

FIG. 1 shows a conventional neural network. Any number (one in the illustrated example) of hidden layers are provided between an input layer and an output layer. A set of input data $X_1, X_2, X_3, \ldots, X_n$ is input to the input layer. In FIG. 1, "1" is also always supplied for adjusting the output from neurons. Products of those inputs and coupling weights $W_1, W_2, W_3, \ldots, W_n, W_{n+1}$ are inputs $U_1$ to neuron Ne. An output from the neuron is $V_1$. $U_1$ and $V_1$ are calculated by equations (1) and (2).

$$U_1 = \sum_{i=1}^{n} X_i \cdot W_i + 1 \cdot W_{n+1} \quad (1)$$

$$V_1 = \frac{1}{(1 + e^{-U_1})} \quad (2)$$

Similar equations are applied to the inputs and the outputs of other neurons of the hidden layers and the output layers. Only one Na of the neurons of each hidden layer is coupled with "1" for adjusting the output of a neuron connected thereto which the output of the connected neuron is equal to "1" to provide a predetermined coupling weight.

In JP-A-2-100757, a learning method of a parallel neural network is proposed. It is stated therein that a back propagation method is becoming effective as a learning method. A conventional learning method has disadvantages in that the learning does not proceed once it falls in a local minimum and a precision of learning sharply decreases when the amount of data to be learned is large. In the proposed method, more than one neural network is connected in parallel to serially learn in order to improve the efficiency and the precision of the learning.

Thus, in the conventional neural network, an operation of learning is essential. The learning means includes coupling weights among the neurons that are determined through iterative calculations so that a calculated value approximated to data called teacher data which is predetermined for input data is output from the output layer when the input data is applied. For example, it is the learning to gradually modify the coupling weights through the iterative calculations, to reduce an error which is defined as 0.5 times of a square sum of a difference between the teacher data and the calculated output. If the learning proceeds well, the error decreases, but in some cases the error does not decrease and the calculated output is not attained with sufficient precision even after a large number of times of learning. Such a case is referred to as the neural network having fallen in a local minimum. In such a case, it is not possible to get out of the local minimum whatever number of times of the learning is increased and appropriate coupling weights are not determined.

Even if the calculated output converges to a desired value, a large number of times of learning requires a very long time (for example, several hours or more) depending on the scale of the neural network and the teacher data.

A method for reducing the learning time is disclosed in JP-A-3-286388, JP-A-3-201158 and JP-A-3-201160. In JP-A-3-286388, the coupling weight W(k) is so modified that it is proportional to a difference between a teacher signal U(k) and a mathematical equation model output Z(k). In JP-A-3-201158 and JP-A-3-201160, the variance of a coupling weight is modified in accordance with a learning constant and a learning variable. However, there still remains the problem that the learning time is long.

In the conventional neural network, the optimum number of hidden layers and the number of neurons are determined by a trial and error method. It is inefficient and the improvement thereof has been desired.

The neural network used for the diagnostics of the abnormal state of equipment usually includes an input layer, hidden layers and an output layer, and the numbers of neurons of the respective layers are huge and hence a long time is required for the learning. The numbers of neurons of the input layer and the output layer are determined by the types of sensors used and the types of trouble to be detected. However, it is difficult to previously determine the number of neurons of each of the hidden layers, and it is determined in the trial and error method in any case. For example, in "Neural Networks", Vol. 4, No. 1, 1991, pages 61–66, a relatively small scale neural network is disclosed in which a total error of the neural network is calculated after every 100 times of learning are completed for a hidden layer starting from the hidden layer with one neuron. If the error does not decrease by more than 1%, the number of neurons of the hidden layer is increased by one, and if the error is reduced by more than 1%, another 100 times of learning are made. In this method, since the number of neurons of the hidden layer increases remarkably in certain cases, a method for reducing the number of neurons of the hidden layer is also introduced. In the reduction method, once the neural network converges, the number of neurons of the hidden layer is reduced by one and the learning is conducted. If the neural network converges, the above is repeated. This process is repeated until the neural network no longer converges. In this method, however, since the learning time is inherently long, a long time is required to construct the neural network.

Further, because of rapid progress in various technical fields, it may be desired to modify the neural network if a new sensor which is effective for modification, expansion or detection of trouble is developed after the completion of the learning of the neural network. In such a case, re-learning is required for the previously learned inputs and a new input. However, when the large-scaled neural network is used, it is a great loss of time to repeat the learning starting from the hidden layer with one neuron to the final stage while increasing the number of neurons one at a time.

SUMMARY OF THE INVENTION

In accordance with a first aspect of the present invention, there is provided a neural network system which precisely and readily produces a coupling weight.

In accordance with a second aspect of the present invention, there is provided a neural network system which readily determines the appropriate number of hidden layers and the appropriate number of neurons of the neural network system.

In accordance with a third aspect of the present invention, there is provided a diagnostic/control system which efficiently diagnoses a fault or controls a target by using the above neural network system.

In accordance with the present invention, there is provided a neural network system comprising sensor means including a plurality of sensors for sensing a plurality of states of an object, network means including a neural network for outputting data for the object based on the sensed states, and configuring means for configuring the neural network based on a set of data patterns and teacher data corresponding to the data patterns.

In accordance with the present invention, since the number of hidden layers, the number of neurons required therefor and the coupling weights are determined in an analytical manner, the iterative learning required in the conventional system is not necessary, and therefore efficient diagnosis is attained in a short time.

It has been proven that the number of hidden layers is two at maximum. Since the coupling weights are analytically and readily determined, the present invention is effective for a large scale neural network system having a large volume of input data and output data.

Where the input data is to be added to enhance the accuracy of the diagnosis, whether or not such adding is worthwhile is determined based on the input data and the teacher data, and if it is determined not to be worthwhile, the addition is suspended so that the memory can be effectively utilized. Further, the configuration of the neural network can be readily changed.

BRIEF DESCRIPTION OF THE DRAWINGS

FIGS. 4A, 4B, 4C and 4D show data from a sensor 4-1 in abnormal 1, abnormal 2, abnormal 3 and abnormal 4 states, respectively;

DESCRIPTION OF THE PREFERRED EMBODIMENTS

Figure 1:
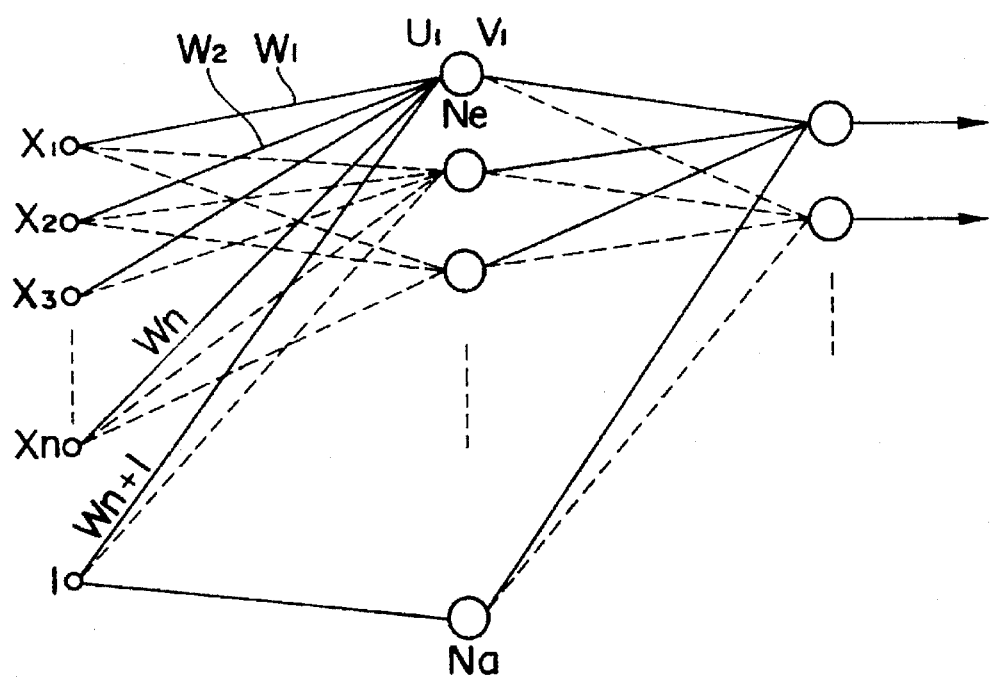
FIG. 1 shows a configuration of a conventional neural network.

A diagnosis/control neural network system 1 of the present invention is now explained in detail with reference to the accompanying drawings.

A configuration of the neural network system 1 of the present invention is explained with reference to FIG. 2 in which the present invention is applied to electric power equipment. The neural network system 1 includes the electric power equipment 2, a set of sensors 4 including sensors 4-1, ..., 4-n, a signal processing section 6, a neural network section 8, a display unit 10 and a network configuring section 12. The sensor 4-1 is mounted on the electric power equipment 2 to determine the sense a status of the equipment 2. The sensor 4-1 may be a frequency analyzer or a gas constituent analyzer. When the electric power equipment is insulated by $SF_6$ gas, the sensor 4-1 senses gas constituents ($CF_4$, $CO_2$, $SF_4$, $SO_2$, $CH_4$, $CO$, $SO_2F_2$). The signal processing section 6 extracts necessary characteristics from the output of the sensor 4-1. The extracted characteristics are supplied to the neural network section 8 in the diagnosis mode. An output of the sensor 4-n is similarly processed. In the present embodiment, the sensor 4-1 is used for the diagnosis but is not used for control. The sensor 4-n may be used only for control.

The neural network section 8 outputs the diagnosis result to the display unit 10 in the diagnosis mode and a control command to the display unit 10 and/or the electric power equipment in the control mode, in accordance with the output from the signal processing section 6.

A plurality of sample data sets and a corresponding teacher data set are supplied to the network configuring section 12, which configures the neural network in the neural network section 8 in accordance with those data.

Figure 3:
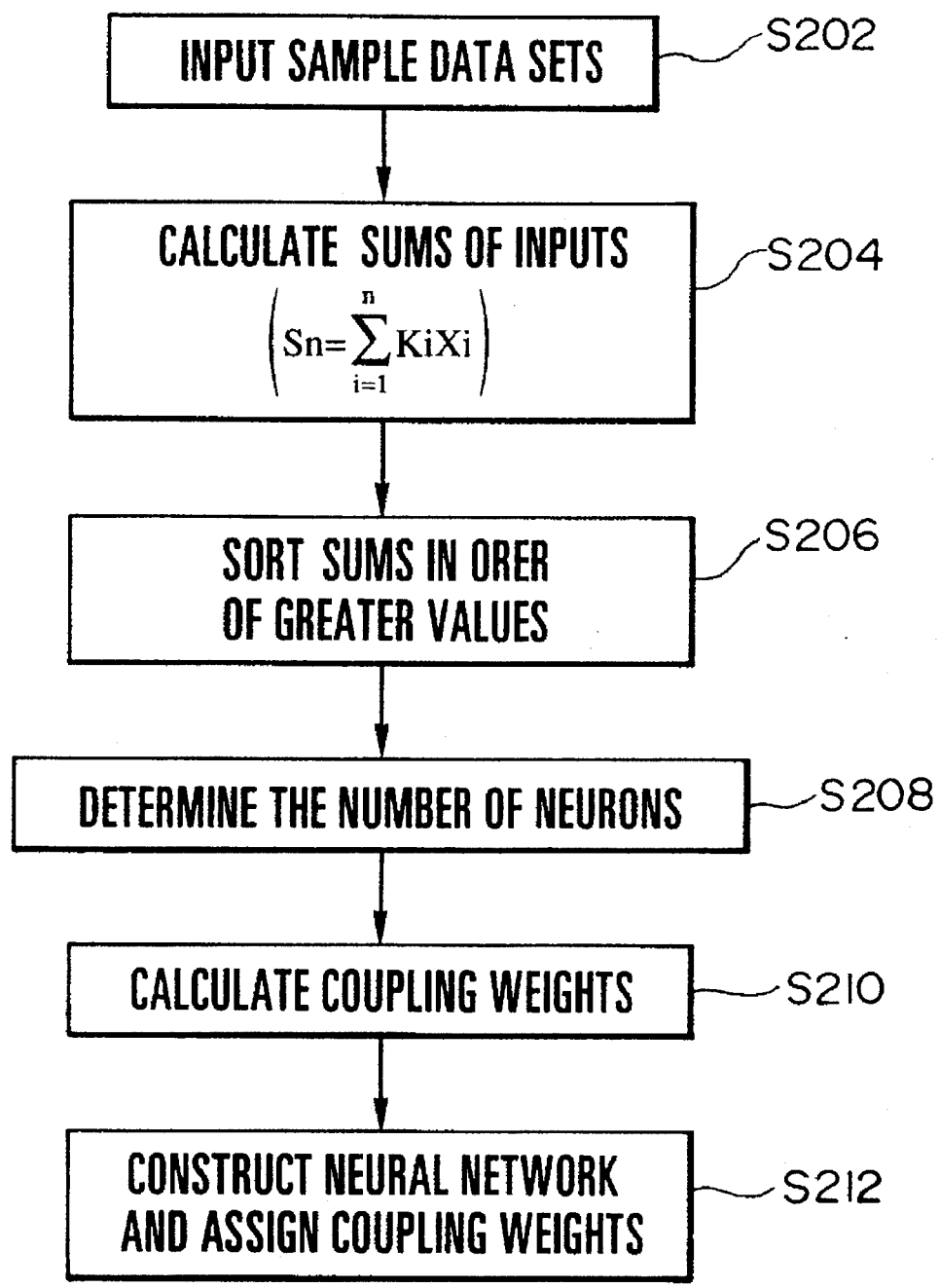
FIG. 3 shows a flow chart of an operation of a network configuring unit shown in FIG. 2.

A method for configuring the neural network of the present invention is now explained with reference to FIG. 3.

In step S202, a network configuring section 12 inputs the sample data sets and teacher data set for the respective cases. The sample data of each set for the case $X_i$ (i=1 to n) is any value of $0 \leq X_i \leq 1$, and the teacher data for the case is either "0" or "1". It has been determined that coupling weights $W_1$, $W_2$, $W_3$, ..., $W_n$ may be assumed to be equal to each other as shown by the following equation (3) in most cases although there is a very rare exception (which will be discussed hereinlater).

$$W_1 = W_2 = W_3 \ldots = W_n \quad (3)$$

A weight $W_{n+1}$ for a threshold modification input 1 usually assumes another value.

Taking the equation (3) into account, in the equation (1), a sum $\Sigma X_i$ of the input sample data $X_i$ is first calculated and then a coupling weight may be multiplied thereto. In step S204, a sum of the inputs is calculated for each data set corresponding to each case. In step S206, the cases are rearranged in an order of the total sum $\Sigma X_i$ and they are displayed together with the corresponding teacher data.

TABLE 1

| Case Number | $\Sigma X_i$ | Teacher Data |
|---|---|---|
| 1' | $S_1$ | 0 |
| 2' | $S_2$ | 1 |
| 3' | $S_3$ | . |
| . | . | |
| n' | $S_n$ | . |

After the rearrangement of the cases, the number of neurons is determined in step S208, and the coupling weights to the neurons are calculated in step S210. Then, the coupling weight are set in the neural network unit in step S212. It has been found through various considerations that the treatment in determining the coupling weights should be changed depending on whether the teacher data to the maximum total sum (which is designated by $S_1$) is "0" or "1". First, it is assumed that the teacher data for $S_1$ is "0".

For the convenience of explanation, a simple case will be discussed first.

Figure 5A:
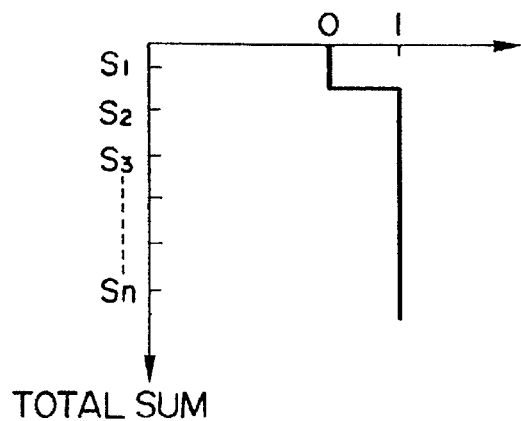
FIG. 5A shows a relationship between sums of input data in the respective cases and teacher data in which the teacher data changes once.
Figure 5B:
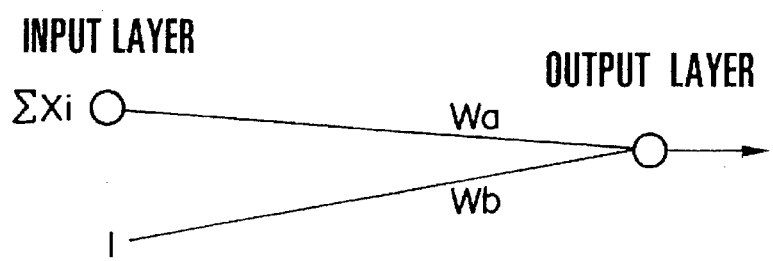
FIG. 5B shows a configuration of the neural network of the present invention when the teacher data changes once.

In FIG. 5A, an ordinate represents $S_1, S_2, S_3, \ldots, S_n$ of Table 1 and an abscissa represents "0" and "1" of the teacher data. In FIG. 5A, the teacher data changes from "0" to "1" at a boundary of $S_1$ and $S_2$. (It may change at other points). In the case of such a simple change, a hidden layer of the neural network is not necessary at all and the network can be configured simply as shown in FIG. 5B. Coupling weights $W_a$ and $W_b$ of the neural network are determined in the following manner.

Looking at the change of the teacher data in Table 1, the sums of the inputs immediately before and after the boundary at which the teacher data changes as shown in Table 1, that is, $S_1$ and $S_2$ in the present example, are used to form the following linear simultaneous equations (4) and (5) with two unknowns.

$$S_1 \cdot W_a + 1 \cdot W_b = -10 \quad (4)$$

$$S_2 \cdot W_a + 1 \cdot W_b = 10 \quad (5)$$

The left terms represent inputs in the cases 1' and 2', and the right terms are the values of the inputs with which the output calculated by the formula (2) is practically "0" or "1" (Where $U_i = -10$, $1/(1+\exp(-(10))) \approx 0$, and where $U_i = 10$, $1/(\exp(-(10))) \approx 1$.).

Assuming $S_1 - S_2 \neq 0$, the above simultaneous equations are solved.

$$W_a = -20/(S_1 - S_2) \quad (6)$$

$$W_b = 10 + 20 S_2/(S_1 - S_2) \quad (7)$$

Since $S_1 > S_2$, $W_a$ is negative and $W_b$ is positive. If S' is smaller than $S_2$, the following inequality is met.

$$S' \cdot W_a + 1 \cdot W_b > 10 \quad (8)$$

Thus, the outputs of $S_3$ et seq in FIG. 5A are closer to 1 than $S_2$ and they can be practically assumed to be 1. It is seen that a set of simultaneous equations as shown by (4) and (5) are for one change in the teacher data.

As seen from FIG. 5B, the coupling weights $W_a$ and $W_b$ are uniquely determined as the solutions of the simultaneous equations. $\Sigma X_i$ is a variable but "1" is a fixed value. Where a sigmoid function is used as an output function of the neuron, a portion relating to "1" may be deleted from the circuit of FIG. 5B if a sigmoid function having an offset of $(1 \cdot W_b)$ along the abscissa is used.

Figure 6:
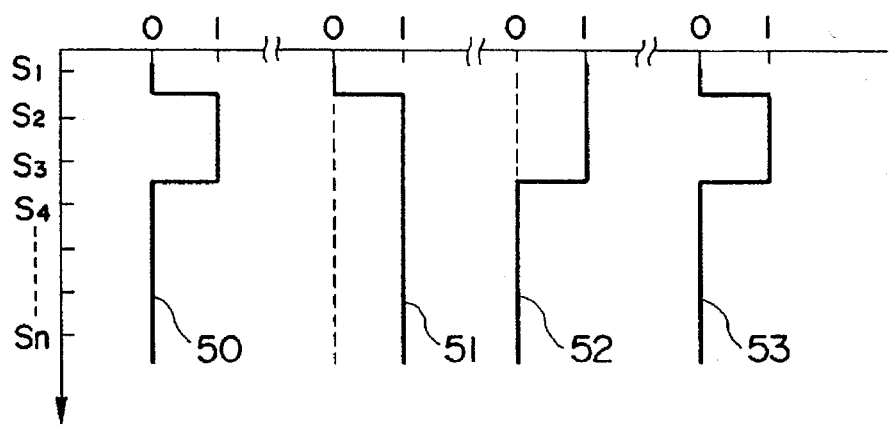
FIG. 6 shows a relationship between total sums of input data in the respective cases and the teacher data in which the teacher data changes twice and a merging method therefor.
Figure 7:
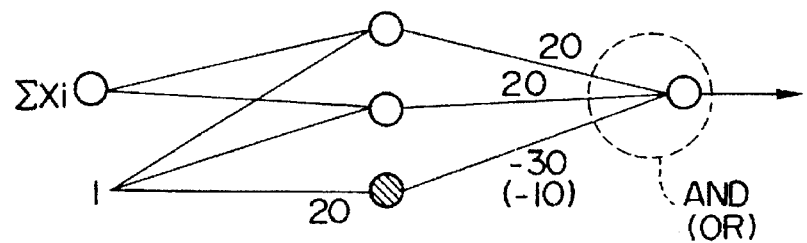
FIG. 7 shows a configuration of the neural network of the present invention when the teacher data changes twice.

In considering the case when the teacher data starts from "0", goes to "1" and returns to "0" again as shown by a segment 50 of FIG. 6, the teacher data changes two times. Since segments 51 and 52 can be generated in substantially the same manner as that in FIG. 5A, they are combined to generate the segment 50. Since the output is "1" only when both of the segments 51 and 52 are "1", it is seen that they may be connected in an AND manner. The output of the AND circuit is "1" when both inputs are "1" so that a segment 53 is generated, which matches the segment 50. A neural network for this case is shown in FIG. 7. Coupling weights of the input layer and the hidden layer are derived by solving simultaneous equations similar to the equations (4) and (5) at the two changes of the teacher data. In this case, consideration is made for the case when the teacher data changes from "0" to "1", and the case when it subsequently changes from "1" to "0". The neuron shown by hatching at the bottom of the hidden layer is for threshold modification. When "20" is designated as the coupling weight between the input layer and the hidden layer as shown, the output is always practically 1. The coupling weights between the hidden layer and the output layer in an AND manner can be determined in a similar simple way. For example, they may be "20", "20" and "–30" as shown in FIG. 7. 20+20–30=+10 and 20–30=–10, which correspond to "+1" and "0", respectively. As seen, "–30" is a bias unit. An OR and (–10) shown in FIG. 7 will be explained hereinafter.

Figure 8:
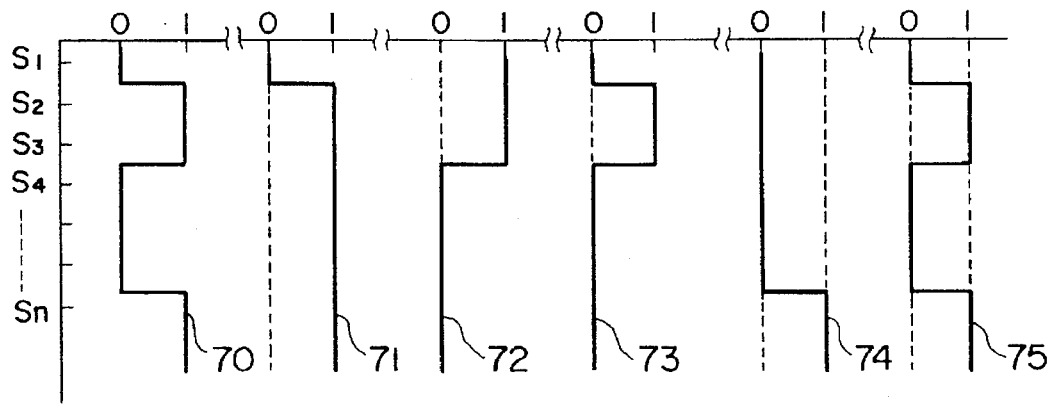
FIG. 8 shows a relationship between total sums of input data in the respective cases and the teacher data in which the teacher data changes three times and a merging method therefor.

Consider a case when the teacher data changes three times as shown by segment 70 of FIG. 8. Since segments 71 and 72 are generated in a similar manner to that described above, segment 73 may be generated by ANDing them. Segment 74 is generated in a similar manner to that for segment 71 and segments 73 and 74 are coupled in an OR manner which outputs "1" when at least one of the inputs thereto is "1". In this manner, segment 75 is generated. It matches to segment 70.

Figure 9:
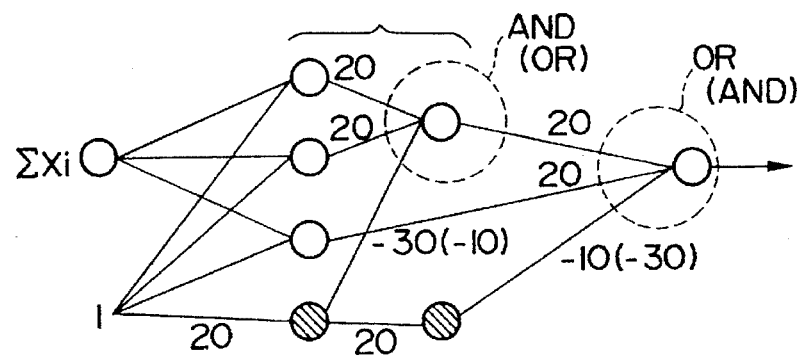
FIG. 9 shows a configuration of the neural network of the present invention when the teacher data changes three times.

A neural network therefor is shown in FIG. 9. Again, the neuron shown by hatching at the bottom of the hidden layer is a bias unit and it always outputs "1". Third output from the top of the first hidden layer is directly connected to the output layer without routing the AND operation neuron. The coupling weights of the OR operation neuron can be determined in a similar manner to that described above. They may be "20", "20" and "−10" as shown in FIG. 9 so that "1" is outputted when at least one of the inputs to the output layer is "1". (−10) is a bias unit. (OR) and (−10) of the hidden layer and (AND) and (−30) of the output layer shown in FIG. 9 will be explained hereinlater.

Similar analysis is conducted while the number of times of change of the teacher data is incremented to derive Table 2:

TABLE 2

The number of times of change of teacher data and the number of neurons of hidden layer

| | | | | | | | | |
|---|---|---|---|---|---|---|---|---|
| Number ($n_1$) of times of change of teacher data | 1 | 2 | 3 | 4 | 5 | 6 | 7 | $n_1$ |
| Number ($n_2$) of neurons of first hidden layer | (1) | 2 | 3 | 4 | 5 | 6 | 7 | $n_1$ |
| Number ($n_3$) of AND operation neurons of second hidden layer | 0 | (1) | 1 | 2 | 2 | 3 | 3 | $*_1$ |
| Number ($n_4$) of OR operation neurons of output layer | 0 | 0 | 1 | 1 | 1 | 1 | 1 | 1 |

$*_1: n_3 = \frac{n_1}{2} - \frac{1}{4} \{1 - (-1)^{n_1}\}$

Table 2 shows a relationships between the number of times of change of the teacher data and the number of neurons of the hidden layer. The number $n_2$ of neurons of the first hidden layer, the number $n_3$ of AND operation neurons (circuits) which are the second hidden layer, and the number $n_4$ of OR operation neurons (circuits) which are the output layer are shown for the numbers "1" to "7" of times of change of of the teacher data and a general number $n_1$ (The neuron for modifying the threshold is separately provided for the hidden layer.). As shown in Table 2, the number of neurons of the first hidden layer is equal to the number $n_1$ of times of change of the teacher data. When the number $n_1$ of times of change of the teacher date is "1", the neuron of the first hidden layer is the neuron of the output layer itself, and when the number $n_1$ of times of change of the teacher data is "2", the neurons of the second hidden layer are the neurons of the output layer. It is convenient to consider that they are the neurons of the hidden layer for the number "1" in the parentheses of Table 2 than to express it as no hidden layer, when a method for calculating the coupling weight is to be considered. It has been proven by the analysis that it is sufficient to consider two hidden layers at most. As described above, when there are a plurality of outputs from the output layer, the above calculation method is repeated.

Figure 10:
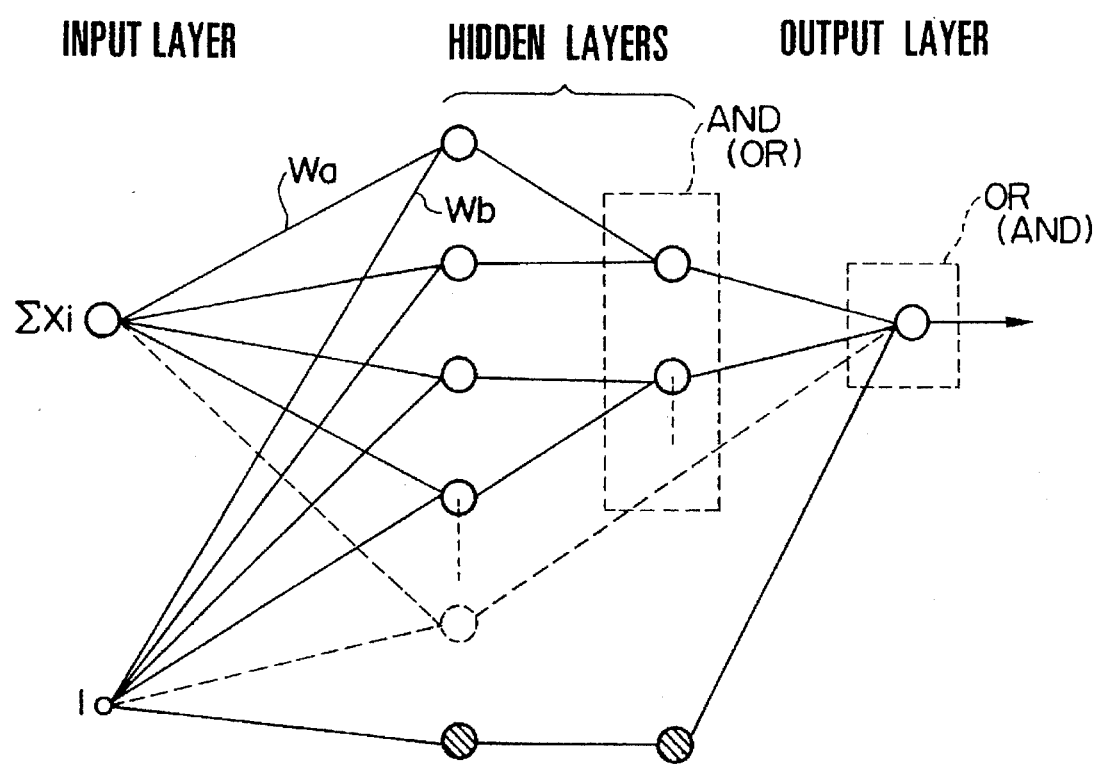
FIG. 10 shows a configuration of the neural network in accordance with an embodiment of the present invention.

More generally, when the number of times of change of the teacher data is relatively large, the configuration of the neural network of the present invention is one shown in FIG. 10. When the number of times of change of the teacher data is odd, there is a direct connection from the first hidden layer to the output layer without routing the second hidden layer. The coupling weights are determined in the manner described above.

Let's consider a case where the teacher data corresponding to the maximum sum $S_1$ of the inputs is 1 as shown in Table 3.

TABLE 3

| Case Number | $\Sigma X_i$ | Teacher Data |
|---|---|---|
| 1' | $S_1$ | 1 |
| 2' | $S_2$ | 0 |
| 3' | $S_3$ | . |
| . | . | . |
| n' | $S_n$ | . |

Figure 11:
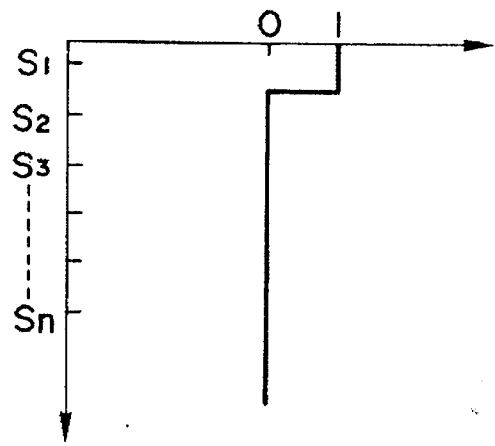
FIG. 11 shows other relationships between total sums of input data in the respective cases and teacher data in which the teacher data changes once.

FIG. 11 shows a case where the teacher data changes once. In FIG. 11, the teacher data changes between $S_1$ and $S_2$ although it may change at other points. The neural network in this case requires no hidden layer and it may be the same one as that shown in FIG. 5 but the coupling weights are different, which are determined by simultaneous equations similar to the equations (4) and (5) but the sign of the right term is changed to render the outputs to be "1" and "0".

Figure 12:
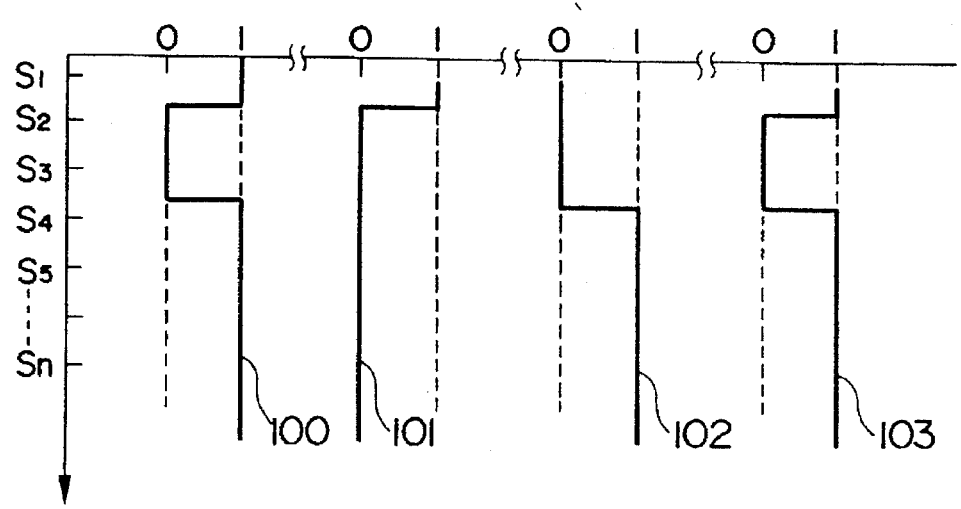
FIG. 12 shows other relationships between total sums of input data in the respective cases and the teacher data in which the teacher data changes twice and a merging method therefor.

FIG. 12 shows a case where the teacher data changes twice as shown by a segment 100. Since segments 101 and 102 are generated in the same manner as described above, the segment 100 may be generated based thereon. When at least one of the segments 101 and 102 is "1", the output is to be "1". That is, they are coupled in an OR manner. In this case, the neural network is substantially identical to that of FIG. 7 but the output layer functions as the OR operation instead of the AND operation and the coupling weight for the threshold modification is changed from "−30" to "−10", for example.

Figure 13:
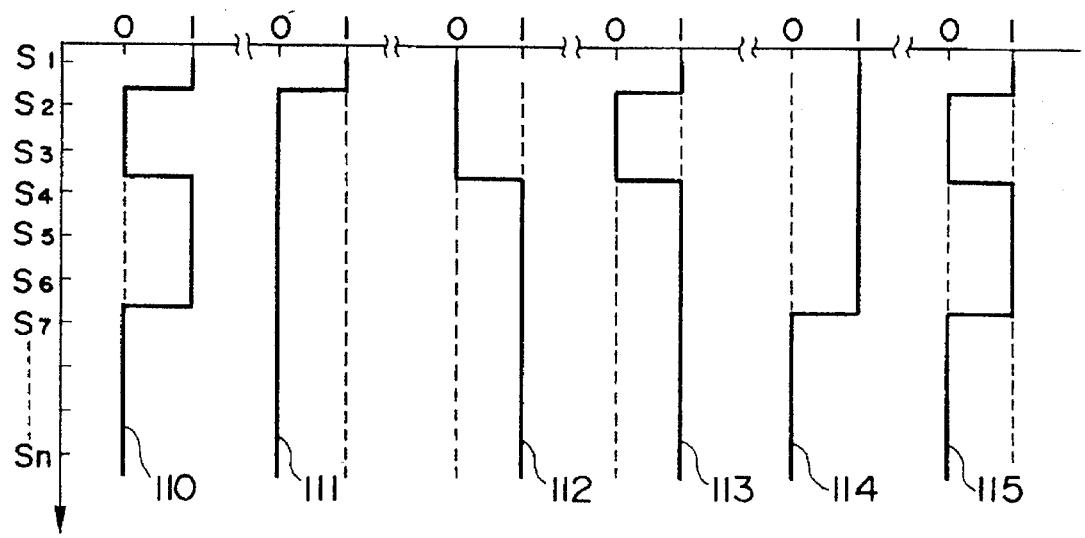
FIG. 13 shows other relationships between total sums of input data in the respective cases and the teacher data in which the teacher data changes three times and a merging method therefor.

FIG. 13 shows a case where the teacher data changes three times as shown by segment 110. In this case, segments 111 and 112 are generated in the same manner as described above, and they are ORed to generate segment 113. Then, segment 114 is generated in the same manner as segment 111. Finally, segment 113 and segment 114 are coupled in an AND manner to generate segment 115, which matches segment 110. In this case, the neural network is substantially identical to that of FIG. 9 but the OR operation neuron is arranged in the second hidden layer and the coupling weight for modifying the threshold is changed so that the output layer functions as the AND operation. The result of the analysis while incrementing the number of times of change of the teacher data is summarized in Table 4.

TABLE 4

| | | | | | | | | |
|---|---|---|---|---|---|---|---|---|
| Number ($n_5$) of times of change of teacher data | 1 | 2 | 3 | 4 | 5 | 6 | 7 | $n_5$ |
| Number ($n_6$) of neurons in first hidden layer | (1) | 2 | 3 | 4 | 5 | 6 | 7 | $n_5$ |
| Number ($n_7$) of OR operation neurons of second hidden layer | 0 | (1) | 1 | 2 | 2 | 3 | 3 | $*_2$ |
| Number ($n_8$) of AND operation neurons of output layer | 0 | 0 | 1 | 1 | 1 | 1 | 1 | 1 |

$*_2: n_7 = \frac{n_5}{2} - \frac{1}{4} \{1 - (-1)^{n_5}\}$

Table 4 shows the number $n_6$ of the neurons of the first hidden layer, the number $n_7$ of OR operation neurons as the number of neurons of the second hidden layer, and the number $n_8$ of the AND operation neurons in the output layer, for the numbers "1" to "7" of times of change of the teacher data and a general number $n_5$ when the teacher data of $S_1$ is "1". As in Table 2, the neuron for modifying the threshold is separately provided for the hidden layer and the number "1" in the parentheses also represents the outputs of the output layer. By comparing Table 2 and Table 4, it is seen that the AND and OR are simply replaced., In this case, two hidden layers at most may be considered.

More generally, where the number of times of change of the teacher data is relatively large, the configuration of the neural network is like that shown in FIG. 10. When the number of times of change of the teacher data is odd, there is a case where direct connection is made from the first hidden layer to the output layer without routing the second hidden layer as shown by a broken line. The second hidden layer includes the OR operation neurons and the output layer includes the AND operation neurons. The method for calculating the coupling weights is the same as described above.

Where a plurality of outputs are required for the output layer, the analysis is repeated for each output in the process described above. When the outputs are to be determined, a portion of the neural network may be shared if the boundary of the change of the teacher data shown in Table 1 and Table 2 are same. Thus, the entire configuration may be simplified utilizing this fact.

Figure 4E:
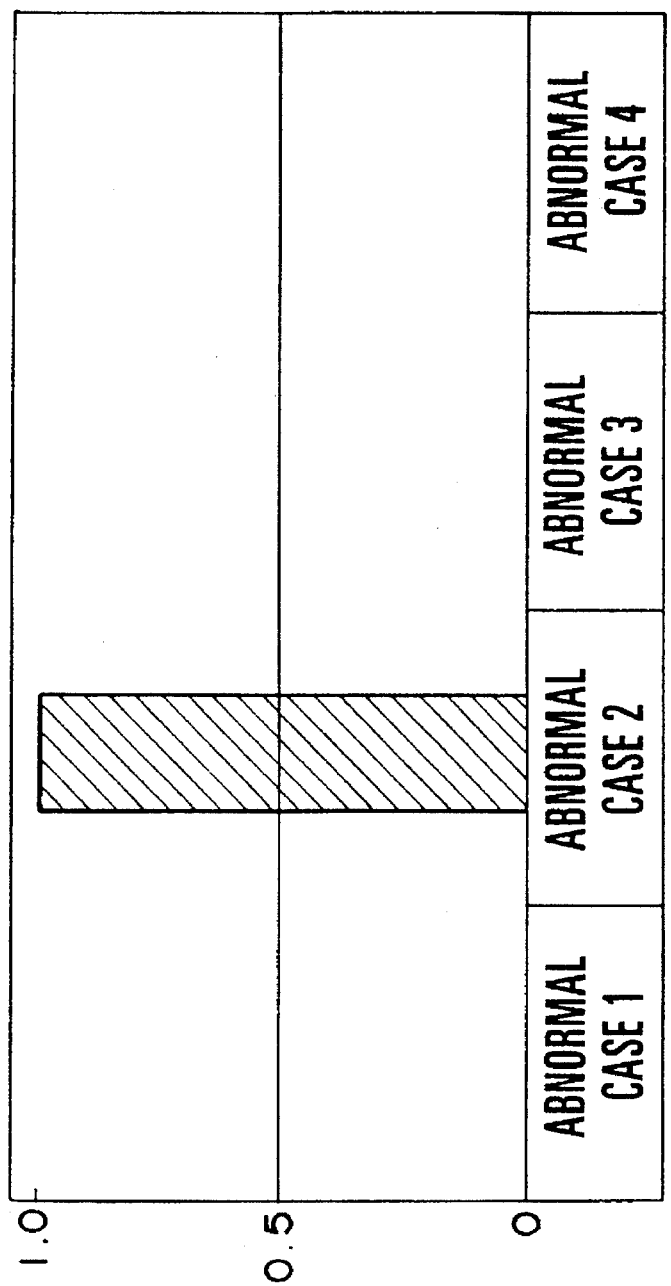
FIG. 4E shows a display on a display unit 10.

In the present embodiment, the network configuring unit 12 receives aggregation of data sensed by the sensor 4-1 and processed by the signal processing unit 6, that is, a data pattern, for each case. In examples shown in FIGS. 4A to 4D, proportions of gas components ($CF_4$, $CO_2$, $SF_4$, $SO_2$, $CH_4$, $CO$, $SO_2F_4$) are received as the data pattern. For abnormal case 1 in FIG. 4A, three cases shown by symbols 0, ●, △ are received, for abnormal case 2 of FIG. 4B, two cases shown by symbols 0, ● are received, for abnormal case 3 of FIG. 4C, two cases shown by symbols 0, ● are received, and for abnormal case 4 of FIG. 4D, three cases shown by symbols 0, ●, △ are received. There is a total of 10 data patterns. For each case, $S_n$ ($\Sigma X_i$) is calculated and the neural network is prepared by using the method described above. Since four outputs, abnormal 1, abnormal 2, abnormal 3 and abnormal 4 are needed as the outputs, the neural network is constructed by four sub-networks, each of which is configured in the manner described above. In this case, the input layer may be shared to reduce the number of neurons. When the data pattern for the abnormal case 2 is received from the signal processing unit 6, the diagnosis result by the neural network unit 8 is displayed on the display unit 10 as shown in FIG. 4E.

In the control mode, the neural network is configured based on the data from the sensor 4-n. When the data pattern of the sensor 4-n is applied through the signal processing unit 6 in the control mode, the neural network outputs a control command to control the electric power facilities.

Figure 18:
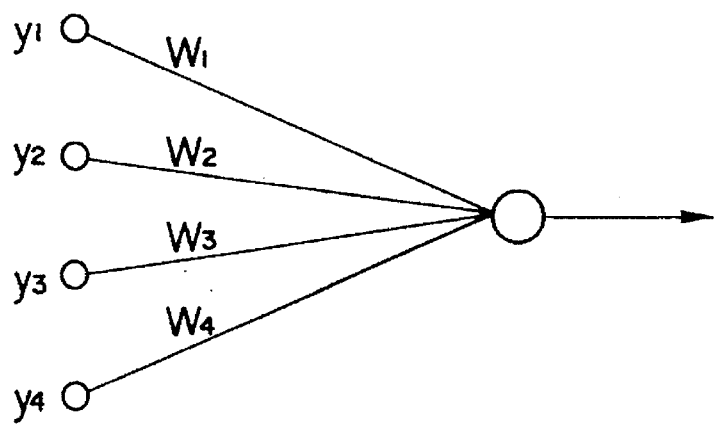
FIG. 18 shows inputs and outputs after the increase of the inputs.

In the equations (6) and (7), when $S_1$ and $S_2$ are equal, the denominators of those equations are zero. In such a case, instead of simply summing the inputs, a number $K_i$ which is determined from a random number and which is not "1" is multiplied to each input before the summation. Namely, $\Sigma K_i X_i$ are calculated and then they are handled in the same manner as $S_1$, $S_2$, $S_3$, ..., $S_n$ of Table 1 and Table 3. By doing so, it rarely occurs that the denominators of the equations (6) and (7) are zero, except when the inputs of the plurality of cases are totally equal. If the denominators of the equations (6) and (7) are still zero, a process of deriving another random number may be repeated. As is apparent from the previous description, the fact that the denominator is zero causes a problem only when $S_1$ and $S_2$ are equal and the corresponding teacher data are different. Even if $S_1$ and $S_2$ are equal, no problem is raised if the corresponding teacher data are equal, since they are not used for the calculation of the coupling weights. Accordingly, more generally, in table 2 and Table 4, $\Sigma X_i$ is not calculated as a simple summation but $\Sigma K_i X_i$ is calculated by using the number $K_i$ determined from the random number and the calculation may be proceeded in the manner described above. In this case, the coupling weight for each input $X_i$ may be considered to be $K_1 X_i$. When $K_i$ is used as the weight factor, it can be readily attained by adding a neuron as shown in FIG. 18 to the input layer. It is assumed that $S_1'$ and $S_3'$ are equal, the corresponding teacher data are equal, and there is a sum $S_2'$ which is between $S_1'$ and $S_3'$ and has the teacher data equal to the teacher data for $S_1'$ and $S_3'$. In such a case, as is apparent from the above equations, there is no change among the three teacher data and hence $S_2'$ is not used for the calculation of the coupling weight. Accordingly, it is seen that the data $S_2'$ does not exist as the diagnosis data and it is not worth adding, and it may be deleted to save the memory space. But, if the newly added teacher data changes the boundary of the change of the teacher data, it is worth adding.

In the equations (4) and (5), the output "0" or "1" is approximated from the neuron. In the conversion shown in FIG. 14, considering $\epsilon$, a positive number close to zero, $\epsilon$ and $(1-\epsilon)$ are used for the intermediate calculation instead of "0" and "1", and in a final output stage, it is returned to a number in the range from "0" to "1". When this is applied to the right terms of the equations (4) and (5), they are expressed by $$S_1 \cdot W_a + 1 \cdot W_b = \log (\epsilon/(1-\epsilon)) \qquad (9)$$

$$S_2 \cdot W_a + 1 \cdot W_b = -\log (\epsilon/(1-\epsilon)) \qquad (10)$$

where log is natural logarithm. In the method in which the output of the equation (2) is treated as "0" or "1" for practical reasons, approximation calculation is partially included and hence an error is introduced. The present method includes no such error.

Figure 15:
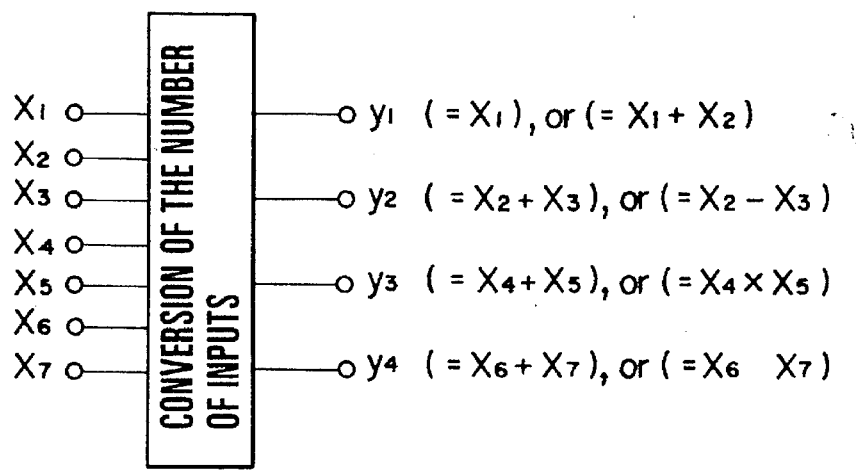
FIG. 15 shows an operation to reduce the number of inputs.

The neural network may be used after the conversion of the number of input data to make the number of cases equal to the number of input data per case. By such conversion, a number of cases can be simply handled by simultaneous equations as will be explained. FIG. 15 shows a case where the number of inputs after the conversion of the number of input data is smaller than the initial number. FIG. 15 is applicable when the number of inputs per case is larger than the number of cases. In such a case, the number of input data is converted to make it equal to the number of cases. An appropriate operation is summation (or a combination of difference, product and quotient) of a plurality of input data in one case as shown in FIG. 15, and the data after the operation is regarded as the input data.

Figure 16:
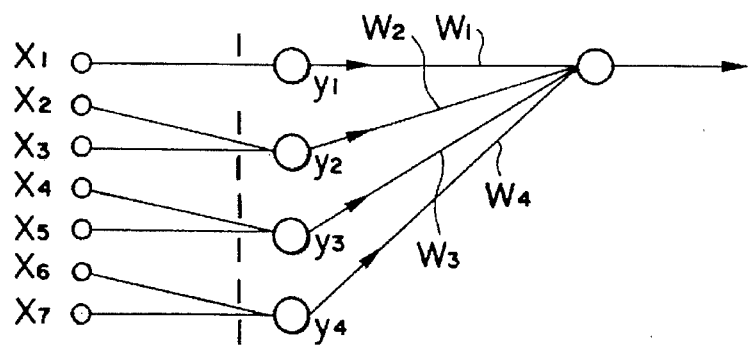
FIG. 16 shows the conversion in which the neural network converts the number of inputs by itself.

FIG. 16 shows a case in which the conversion of the number of input data is conducted by the neural network itself. The coupling weight between the input layer and the hidden layer is selected as shown to reduce the total number of outputs from the hidden layer than the initial number of inputs so that it matches the number of cases.

Figure 17:
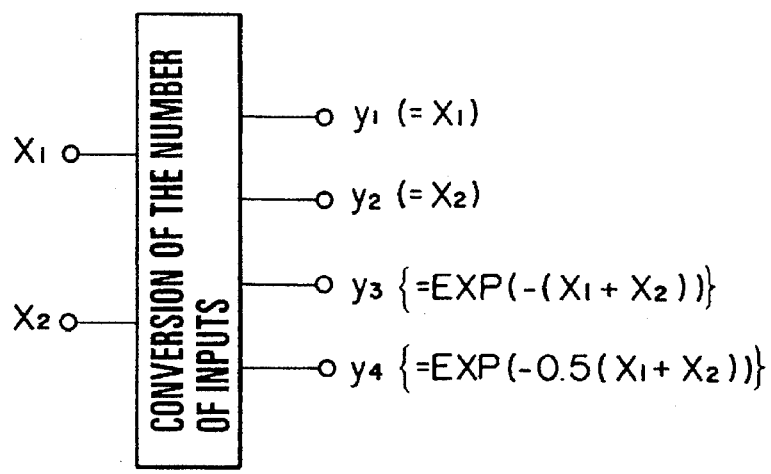
FIG. 17 shows an operation to increase the number of inputs.

To increase the number of inputs after the conversion to be more than the initial number of input data, an appropriate value can be derived from the initial inputs by using an exponential function or a sine or cosine function as shown in FIG. 17.

In FIG. 18, the inputs after the operation to increase the number of inputs is applied to a sub-network of the neural network to handle four cases. An example applied to an Exclusive OR (XOR) function is explained in detail with reference to FIGS. 17 and 18.

In the XOR operation, four cases are considered for two inputs $X_1$ and $X_2$ as shown in Table 5.

TABLE 5

| Case Number | Input | | Inputs after conversion of number of inputs | | | | XOR Output |
|---|---|---|---|---|---|---|---|
| | $X_1$ | $X_2$ | $y_1$ | $y_2$ | $y_3$ | $y_4$ | |
| 1 | 1 | 1 | 1 | 1 | 0.135335 | 0.367879 | 0 |
| 2 | 1 | 0 | 1 | 0 | 0.367879 | 0.606531 | 1 |
| 3 | 0 | 1 | 0 | 1 | 0.367879 | 0.606531 | 1 |
| 4 | 0 | 0 | 0 | 0 | 1 | 1 | 0 |

Thus, the number of inputs is converted so that the number of cases is equal to the number of inputs and it is deemed that the inputs $y_1$, $y_2$, $y_3$ and $y_4$ are applied. In the present case, $y_1$ and $y_2$ are $X_1$ and $X_2$ themselves, and $y_3$ and $y_4$ are calculated as exponential functions of $X_1$ and $X_2$ by the following formulas (11) and (12).

$$y_3 = \exp(-(X_1 + X_2)) \quad (11)$$

$$y_4 = \exp(-0.5(X_1 + X_2)) \quad (12)$$

Let's consider output "0", "1", "1" and "0" for those inputs as shown in Table 5. The following simultaneous equations are derived for each case by taking the neural network of FIG. 18 into consideration.

The values in the right terms are selected to be −10 and 10 from the standpoint that "0" or "1" is approximately output by the calculation formula of Table 1.

$$1.000000 \cdot W_1 + 1.000000 \cdot W_2 + 0.135385 \cdot W_3 + 0.367879 \cdot W_4 = -10 \quad (13)$$

$$1.000000 \cdot W_1 + 0.000000 \cdot W_2 + 0.367879 \cdot W_3 + 0.606531 \cdot W_4 = 10 \quad (14)$$

$$0.000000 \cdot W_1 + 1.000000 \cdot W_2 + 0.367879 \cdot W_3 + 0.606531 \cdot W_4 = 10 \quad (15)$$

$$0.000000 \cdot W_1 + 0.000000 \cdot W_2 + 1.000000 \cdot W_3 + 1.000000 \cdot W_4 = -10 \quad (16)$$

By solving the above equations, the following coupling weights are derived.

$$W_1 = -21.426952 \quad (17)$$

$$W_2 = -21.426952 \quad (18)$$

$$W_3 = -157.100139 \quad (19)$$

$$W_4 = +147.100139 \quad (20)$$

In the method of converting the number of inputs, the number of input data per case after the conversion matches the number of cases in any case. Accordingly, by combining it with the simultaneous one-dimension equations described above, the neural network can be readily configured.

The same problem is solved by the general solution method explained in connection with Tables 1–4 and FIGS. 7 and 10 to get the following results:

(1) The sums of the two inputs are 2, 1, 1 and 0 in descending order.

(2) The teacher data therefor are 0, 1, 1 and 0, respectively (starting from 0).

(3) The number of times of change of the teacher data is two as follows; (0→1, 1→0).

(4) Accordingly, in configuring the neural network, the number of neurons of the first hidden layer is 2 from Table 3, excluding one for modifying the threshold value, and the number of AND operation neurons for coupling it as the neurons of the second hidden layer is 1. The output from the AND operation neuron is the final output. No OR operation neuron is required.

Figure 19:
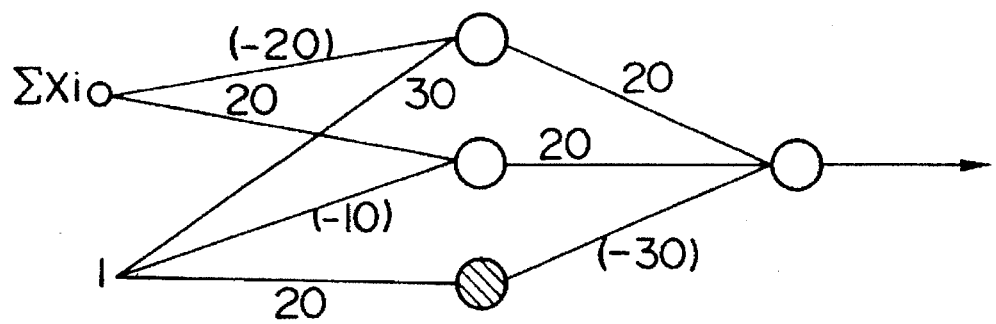
FIG. 19 shows a neural network which attains an XOR function.

(5) The coupling weights are those shown in FIG. 19.

Where the input "1" is always used for modifying the threshold value as shown in FIG. 10, it may be regarded as a special case in which the number of inputs is rendered to be "1" after the summation of the inputs, and the sum of the inputs is divided by itself to produce a normalized "1" output. By building a portion relating to "1" in the output function of the neuron, it may be omitted.

The present invention is also applicable to the recognition and the diagnosis which are not categorized as the neural network. Where the number of inputs per case is equal to the number of cases or it is so converted, the input is not used as the input to the next neuron but the right terms of the simultaneous equations may be regarded to be equal to the case number. In this case, while it is different from the neural network, the case number can be directly calculated if the input is determined and various recognitions and diagnosis can be readily attained.

In the above method, after the configuration of the neural network, for example, including sub-networks such as the number of hidden layers and the number of neurons has been determined, it may become necessary in a case to conduct the learning. In such a case, reverse propagation learning is conducted, as it is in the conventional method, by taking into account the condition that a portion of the coupling weights are equal to each other. In this method, since not only the number of hidden layers and the number of neurons have been determined but also the number of coupling weights to be learned is substantially reduced, the learning time can be shortened. Where a program for the back propagation learning is already installed, the modification of the program is easy and the various functions of the conventional technique can be used while utilizing the advantages of the present invention.

Figure 20A:
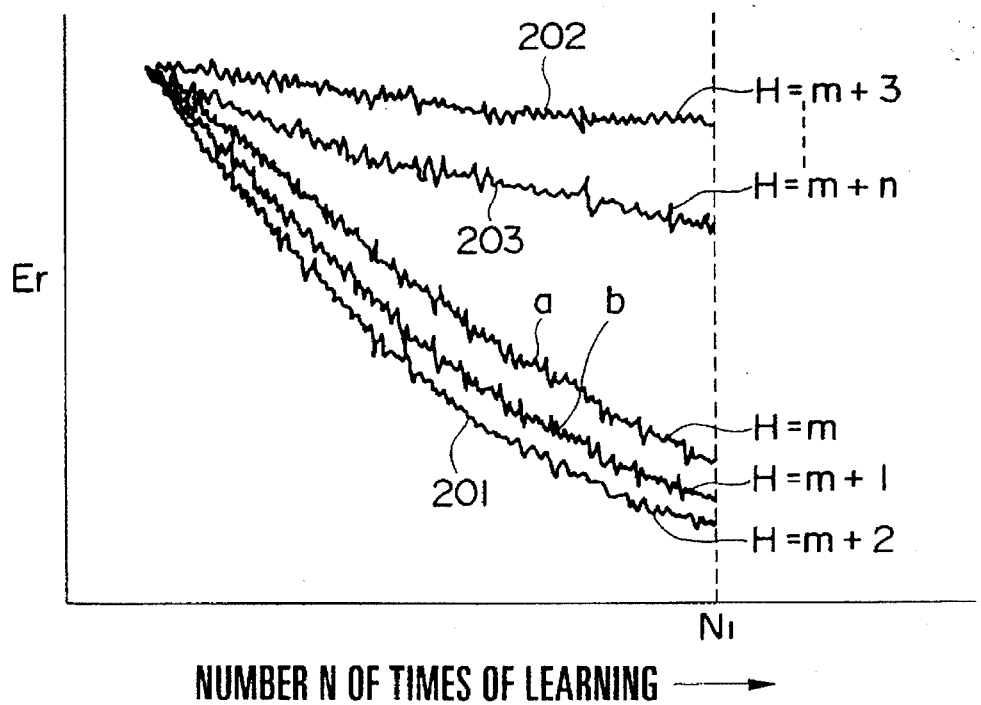
FIG. 20A shows a characteristic chart for selecting an optimum number of neurons in a hidden layer in a neural network configuration method of the present invention.
Figure 20B:
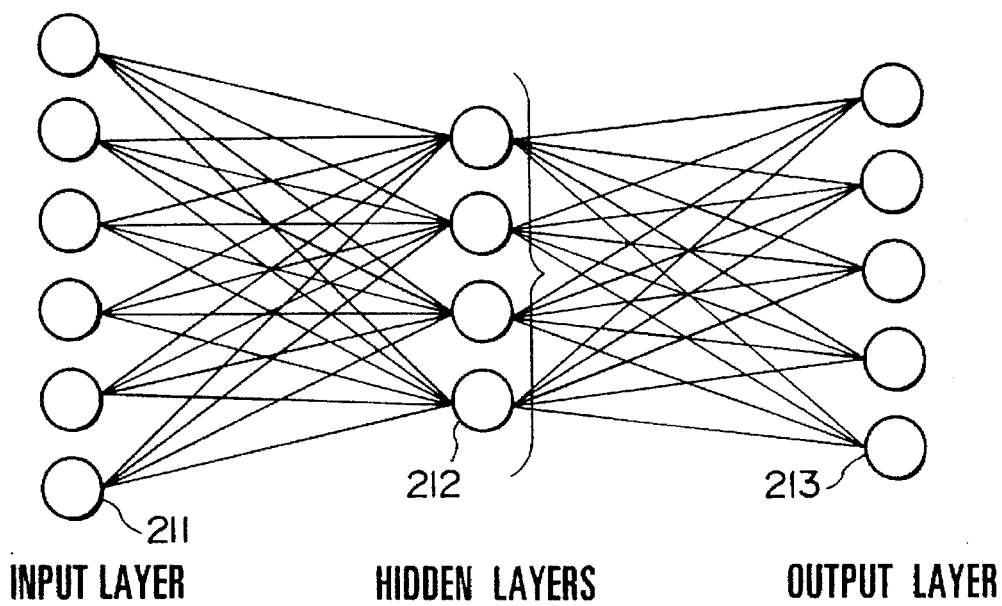
FIG. 20B shows a block diagram of a neural network to which the present invention is applied.

FIG. 20A shows a relationship between the number N of times of learning of the neural network and an error Er in an embodiment of the present invention. FIG. 20B shows a configuration of the neural network in which numeral 211 denotes an input layer to which signals from various sensors are applied, numeral 212 denotes a hidden layer, and numeral 213 denotes an output layer which determines normal/abnormal state and outputs the determined result of a cause therefor. A single hidden layer 212 is shown for the sake of simplicity although there are a plurality of such layers.

FIG. 20A shows results of calculation of errors Er after $N_1$ times of learning by setting the number H of neurons of the hidden layer 212 to m, m+1, m+2, ..., m+n (m≧1). If the number $N_1$ of times of learning is sufficiently large (for example, 3–10% of the preset final number of times of learning), the calculation output approaches the teacher data relatively fast in the neural network which uses an appropriate number H of neurons for the hidden layer 212, and the error Er significantly reduces as shown by a curve 201. On the other hand, in the neural network having inappropriate number H of neurons for the hidden layer 212, the calculation output does not quickly approach the teacher data and the reduction of the error Er is slow as shown by curves 202 and 203. Accordingly, even by the preliminary learning of 3–10% of the preset number of times of learning (preliminary learning), it is possible to roughly determine the validity of the number of neurons.

In the present embodiment, in the stage of the preliminary learning, the number H of neurons of the hidden layer 212 is selected to an optimum number He for the small error Er, and the learning is further continued to reach a target precision. In this manner, the learning can be completed in a relatively short total learning time with sufficient precision. In this case, if a program is so designed that the preliminary learning is conducted by automatically changing the number H of neurons of the hidden layer 212, more efficient learning is attained and an interactive method may be adopted.

Another embodiment of the present invention is explained with reference to FIG. 20A. As seen from FIG. 20A, there is a general trend that the error Er for the number N of time of learning reduces with the number N of times of learning, but there is a partially irregularity. Curves a and b which show a similar characteristic to that of the curve 201 have a small difference around the number $N_1$ of times of learning and hence when a partial irregularity is large the optimum number $H_0$ of neurons of the hidden layer 212 may be misselected. In the present embodiment, in order to prevent such misselection, the optimum number $H_0$ of neurons is selected based on an appropriate calculation conducted for the errors Er between an appropriate number of times of learning before the designated number $N_1$ of times of preliminary learning and $N_1$. The appropriate calculation conducted for the errors Er may be averaging, selection of a minimum, or selection of a maximum of each curve and selection of a minimum one of the maximums of the respective curves. In this manner, the optimum number He of neurons of the hidden layer 212 is selected to further reduce the misselection.

Figure 21:
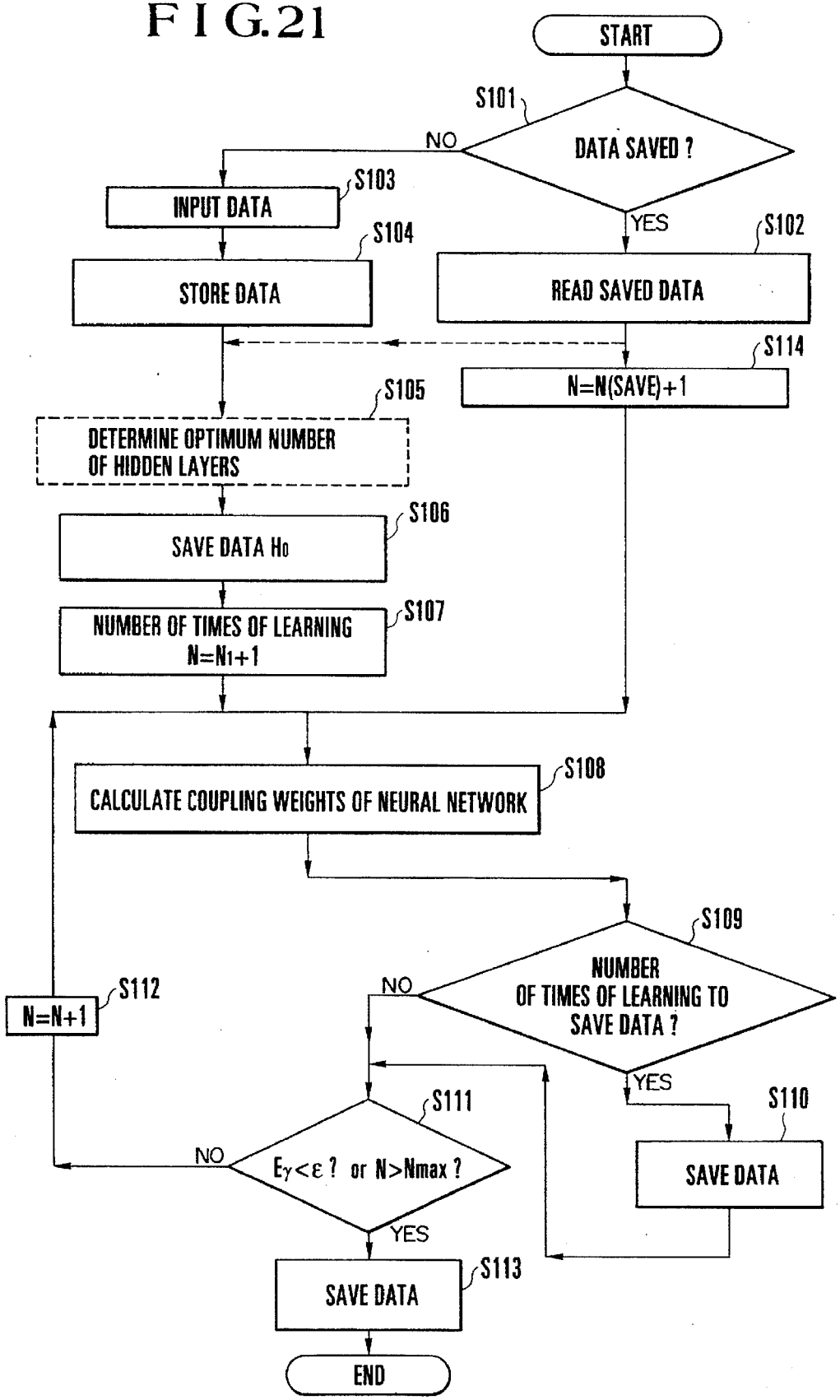
FIG. 21 shows an operation flow chart of the configuration method of the neural network of the present invention.

FIG. 21 shows a flow chart of the other embodiment. When a control unit such as a computer of the neural network is started, a query asking the presence or absence of saved data is displayed on a CRT display screen in step S101. Since there is no saved data in an initial state, the process branches to step S103. In an interactive operation, it branches by the entry of "NO" by an operator. In a step S103, an input operation is conducted. Namely, various data such as neural network, teacher data, an initial value of the number H of neurons of the hidden layer, the number of times of change of the number H of neurons, the number $N_1$ of times of preliminary learning for selecting the optimum number $H_0$, a pitch of the learning to save data, a final number $N_{max}$ of times of learning, and a target value ϵ to determine whether the error Er is sufficiently small are input. When they are input in the interactive manner, the input data are stored in memories in step S104. Then, the preliminary learning is conducted in the manner shown in FIG. 20A to determine the optimum number $H_0$ of neurons of the hidden layer 212 in step S105. In step S106, various data such as the optimum number $H_0$ of neurons and the coupling weight therefor are stored. Then, the learning for the neural network configured by the optimum number $H_0$ is resumed. In step S107, the number N of times of learning is updated to $N=N_1+1$. In step S108, the coupling weights of the neural network are calculated (learned). In step S109, whether the number of times of learning has reached a predetermined number to store the various data or not is checked, and if it has reached the predetermined number, the data are stored in step S110 and the process proceeds to step S111. If it has not reached the predetermined number of times of learning, the process branches from step S109 to step S111. In step S111, whether the error Er is smaller than the target value ϵ or not, and whether the number N of times of learning has exceeded the final number $N_{max}$ or not are checked. If none of the conditions is met, the number N of times of learning is updated to N+1 in step S112 and the process returns to step S108. If the conditions are met, various data such as the coupling weights and, the error Er and the number of times of learning are stored in step S113. In this manner, the neural network is configured.

In a large scale neural network, a considerable learning time is required. For example, it may happen that the selection and the saving of the number H of neurons of the hidden layer 212 are completed but the learning cannot be continued until the final stage because of a working hour regulation in an office or a power failure. In such a case, when the computer is powered again at the next opportunity and the presence of the saved data is indicated in step S101, the data saved in the previous process are read in step S102 and the process is continued from step S105 or S114. The process to be executed by using the saved data may be selected in the interactive manner.

In the present embodiment, a known auto-start method may be adopted, and if there is no key entry for longer than a predetermined time after the power-on of the computer, the saved data may be automatically read to resume the learning.

By the methods described above, the equivalent status to that attained by the conventional iterative learning is attained in an efficient manner. Accordingly, by using the input data used for the calculation, the calculation output which is totally equal to or very close to the teacher data can be output. If the number of cases which are handled in this manner is set large, an output which is approximated to a similar input case can be output even for a totally new case. Accordingly, the present embodiment is applicable to various recognitions and diagnosis.

A comparison between the calculation by the present invention and the calculation by the conventional back propagation learning will be explained. The comparison was made by measuring corona noises of GIS in a known method, frequency analyzing the data stored in a flexible disk and reading representative data.

In the conventional back propagation learning method, the neural network shown in Table 6 was used. In order to determine a structure of a sample GIS, the number of outputs from the output layer was set to 3. It was intended to determine up to 8 (=2×2×2) types.

TABLE 6

| | |
|---|---|
| Number of input data per case | 10 |
| Number of outputs of output layer | 3 |
| Number of hidden layers | 1 |
| Number of neurons of hidden layer | 5 |
| Number of cases | 14 |

Figure 2:
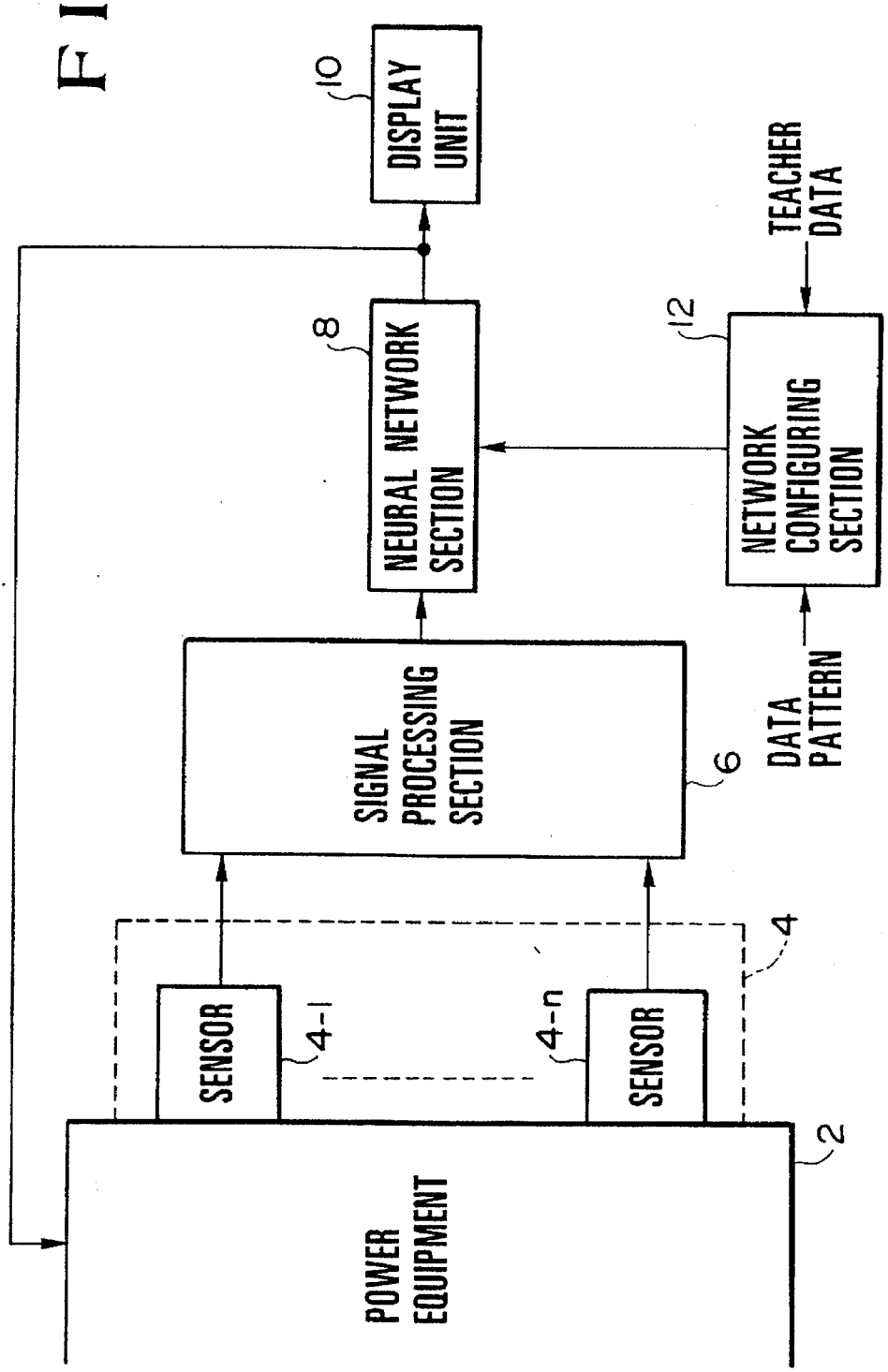
FIG. 2 shows a configuration of a diagnosis control system for electric power equipment which uses a neural network configured by a configuration method of the present invention.
Figure 22:
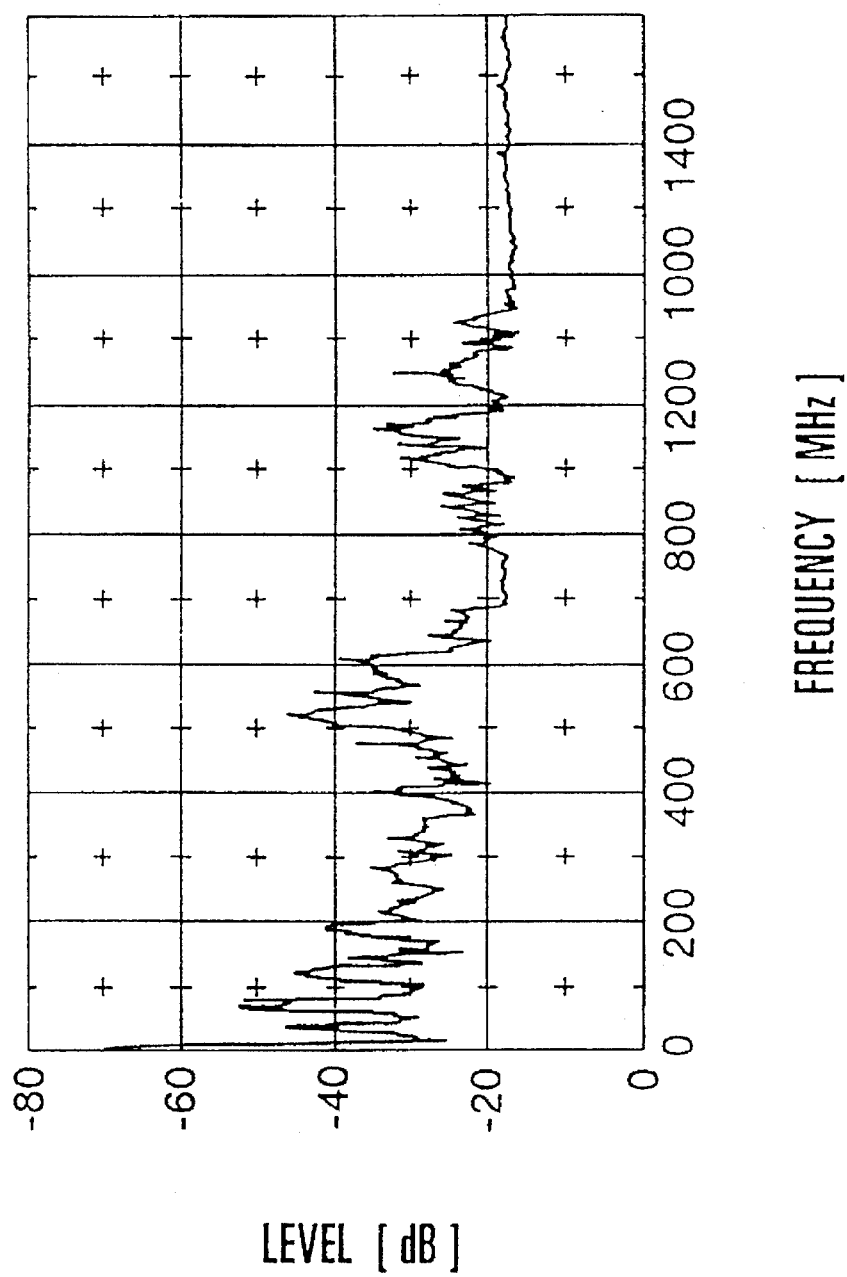
FIG. 22 shows a partial discharge spectrum of a GIS (Gas Insulated Switchgear).

In case that the present invention is applied to the power equipment 2 in FIG. 2 as a GIS, when partial discharge occurs in the DIS, electromagnetic waves of the UHF band are irradiated. The electromagnetic waves are detected by the sensor 4-1 and analyzed in frequency by the signal processing section 6 including a spectrum analyzer. An example of the analyzed result is shown in FIG. 22. The frequency spectrum of FIG. 22 includes an external noise spectrum (<300 MHz) and a spectrum (>300 MHz) due to the partial discharge. The partial discharge spectrum can be characterized in the following data set and it can be determined based on the data set whether the position where the partial discharge occurs is in a gas space or on the surface of an insulator and whether the polarity of the partial discharge is positive or negative.

The data set obtained from the partial discharge spectrum shown in FIG. 22 is:

(1) a upper limit frequency of external noise (300 MHz),
(2) a frequency at the maximum signal level in the 1st frequency band (FB) (521 MHz),
(3) the maximum signal level in the 1st FB (−34.1 dB),
(4) a width of the 1st FB (300 MHz), (5) a frequency at the maximum signal level in the 2nd FB (926 MHz), (6) the maximum signal level in the 2nd FB (−47.6 dB), (7) a width of the 2nd FB (191 MHz), (8) a frequency at the maximum signal level in the 3rd FB (1140 MHz), (9) the maximum signal level in the 3rd FB (−55.7 dB), and

(10) a width of the 3rd FB (33.8 MHz).

Thus, the amount of data in the data set is 10 per a case, as shown in Table 6. The number of neurons in the output layer is 3 for two abnormal states and one normal state. Three preferable outputs (teacher data) for each case are designated as shown in Table 7.

TABLE 7

| Case Number | Teacher Data | | |
|---|---|---|---|
| | Output 1 | Output 2 | Output 3 |
| 1 | 0 | 0 | 0 |
| 2 | 0 | 0 | 0 |
| 3 | 1 | 0 | 0 |
| 4 | 0 | 1 | 0 |
| 5 | 0 | 0 | 1 |
| 6 | 0 | 0 | 1 |
| 7 | 1 | 1 | 0 |
| 8 | 1 | 1 | 0 |
| 9 | 1 | 0 | 1 |
| 10 | 1 | 0 | 0 |
| 11 | 0 | 1 | 1 |
| 12 | 0 | 1 | 1 |
| 13 | 1 | 0 | 1 |
| 14 | 1 | 0 | 1 |

Outputs calculated by the conventional back propagation learning method are shown in Tables 8 and 9.

TABLE 8

| | After 400 times of learning | | | After 800 times of learning | | |
|---|---|---|---|---|---|---|
| Case Number | Output 1 | Output 2 | Output 3 | Output 1 | Output 2 | Output 3 |
| 1 | 0.000 | 0.562 | 0.398 | 0.000 | 0.478 | 0.504 |
| 2 | 0.042 | 0.431 | 0.392 | 0.000 | 0.133 | 0.508 |
| 3 | 0.922 | 0.018 | 0.575 | 1.000 | 0.115 | 0.160 |
| 4 | 0.000 | 0.966 | 0.548 | 0.000 | 1.000 | 0.267 |
| 5 | 0.071 | 0.163 | 0.461 | 0.000 | 0.000 | 1.000 |
| 6 | 0.098 | 0.166 | 1.000 | 0.002 | 0.000 | 1.000 |
| 7 | 0.957 | 0.208 | 0.486 | 1.000 | 0.956 | 0.000 |
| 8 | 0.951 | 1.000 | 0.272 | 1.000 | 1.000 | 0.000 |
| 9 | 1.000 | 0.200 | 0.394 | 0.965 | 0.000 | 0.980 |
| 10 | 0.975 | 0.131 | 0.452 | 1.000 | 0.046 | 0.136 |
| 11 | 0.000 | 0.981 | 1.000 | 0.000 | 1.000 | 1.000 |
| 12 | 0.000 | 0.552 | 0.398 | 0.000 | 0.507 | 0.465 |
| 13 | 0.996 | 0.020 | 0.972 | 0.973 | 0.009 | 1.000 |
| 14 | 0.970 | 0.031 | 0.964 | 0.980 | 0.019 | 1.000 |
| Calculation Time | 1 hour 47 minutes | | | 3 hours 34 minutes | | |
| Total Error | 1.259152 | | | 0.456008 | | |

TABLE 9

| Case Number | After 1200 times of learning | | |
|---|---|---|---|
| | Output 1 | Output 2 | Output 3 |
| 1 | 0.000 | 0.580 | 0.566 |
| 2 | 0.000 | 0.248 | 0.155 |
| 3 | 1.000 | 0.050 | 0.027 |
| 4 | 0.000 | 1.000 | 0.069 |
| 5 | 0.000 | 0.000 | 1.000 |
| 6 | 0.022 | 0.000 | 1.000 |
| 7 | 1.000 | 0.998 | 0.000 |
| 8 | 1.000 | 1.000 | 0.000 |
| 9 | 0.990 | 0.000 | 0.994 |
| 10 | 1.000 | 0.000 | 0.038 |
| 11 | 0.000 | 1.000 | 1.000 |
| 12 | 0.000 | 0.601 | 0.537 |
| 13 | 0.984 | 0.000 | 1.000 |
| 14 | 0.989 | 0.005 | 1.000 |
| Calculation Time | 5 hours 21 minutes | | |
| Total Error | 0.360491 | | |

In counting the number of times of learning, when the learning is completed one time for each case and all cases have been completed, it is counted as one time of learning. The numbers of times of learning are 400 and 800 in Table 9, and 1200 in Table 9. It is ideal that the calculation output completely matches Table 7 but it does not completely match in the present example. Where "0" is expected as the output, no number smaller than 0.5 is permissible. Similarly, where "1" is expected as the output, the number smaller than 0.5 is not permissible. The impermissible numbers are shown with underscore. As the number of times of learning increases from 400 to 800 and 1200, the number of underscored numbers decreases from 7 to 3 and 2. This shows that the calculation accuracy is enhanced. The times required for the calculation and the sums of the errors of the respective cases at the end of the calculation are also shown. In the present example, it is seen that five hours and twenty minutes are required for the 1200 times of learning and the decrease of the error is slow when the number of time of learning exceeds a certain number. The calculation of the back propagation learning proceeds while the number of times of learning and the total error are displayed on the CRT. The total error does not decrease monotonously relative to the number of times of learning and it suddenly increases after decrease but gradually decreases as a general trend. In general, Table 10 is still insufficient for the required calculation precision and further learning is required.

Figure 14:
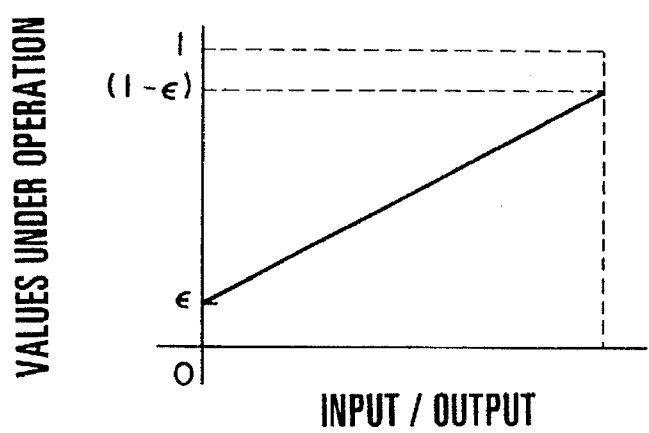
FIG. 14 shows the conversion between values being operated and the input and output.

Calculation result by the methods of FIGS. 10 and 14 of the present invention by using the same input data is shown in Table 10.

TABLE 10

| Case Number | Calculation Output | | |
|---|---|---|---|
| | Output 1 | Output 2 | Output 3 |
| 1 | 0 | 0 | 0 |
| 2 | 0 | 0 | 0 |
| 3 | 1 | 0 | 0 |
| 4 | 0 | 1 | 0 |
| 5 | 0 | 0 | 1 |
| 6 | 0 | 0 | 1 |
| 7 | 1 | 1 | 0 |
| 8 | 1 | 1 | 0 |
| 9 | 1 | 0 | 1 |
| 10 | 1 | 0 | 0 |

TABLE 10-continued

| Case | Calculation Output | | |
|---|---|---|---|
| Number | Output 1 | Output 2 | Output 3 |
| 11 | 0 | 1 | 1 |
| 12 | 0 | 1 | 1 |
| 13 | 1 | 0 | 1 |
| 14 | 1 | 0 | 1 |
| Calculation Time | | 0.84 second | |
| Total Error | | 0.000 | |

As seen from Table 10, the calculation output rounded at fourth digit below a decimal point completely matches the teacher data shown in Table 8. The time required for the calculation of the coupling weights is 0.84 second. According to the above description, the characteristic values extracted from the frequency spectrum shown in FIG. 22 are used as the input data set. However, the frequency spectrum may be used as the input data set as it is. In this case, the spectrum is divided into 200 sections with respect to a frequency axis and a frequency and a signal level in each section are used input data. That is, 200 frequencies and 200 signal levels are obtained as the input data set. The number of outputs in the output layer is 5, 4 for abnormal states and 1 for a normal state, and 10 teacher data are used. In this example, although the learning is performed over five hours, coupling weights cannot be finally determined by the conventional back propagation method. On the other hand, the coupling weights can be determined with about 11 seconds in the present invention. In the method of the present invention, since the analytical calculation is made and the iterative calculation to converge the number is not included, the calculation time is very short.

Where the teaching of the present invention is applied to the neural network which requires the conventional back propagation method, the time required for the learning is significantly reduced because the number of hidden layers and the number of neurons are known, the relationship between the coupling weights are known and the number of coupling weights which actually require the learning is very small, and the functions of the conventional program can be utilized as they are.

While the above description is primarily based on software, the present invention may be implemented by hardware having a similar function. The fields of application of the present invention are not only engineering fields but also biotechnology and medical fields as well as the recognition and diagnosis of physical, chemical and biological phenomena and the recognition and diagnosis in agricultural, educational, economical and other various fields.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A neural network system, comprising:

sensor means including a plurality of sensors for sensing a plurality of states of an object;

network means including a neural network for outputting data for the object based on the sensed states of the object;

means for determining a sum of a plurality of input data constituting a data pattern set which includes teaching data, said means for determining a sum of a plurality of input data determines a plurality of sums of said input data respectively for a plurality of data pattern sets;

means for arranging the plurality of sums of said input data in descending order to obtain an arrangement of respective teaching data;

configuring means for configuring a combination of neurons constituting said neural network by forming a logical operation circuit for outputs of neurons in accordance with the plurality of arranged teaching data.

2. A neural network system according to claim 1, wherein each of said teacher data is binary-value data, and determines a combination of neurons constituting said neural network in accordance with a number of transitions between binary values in a sequence of said plurality of teaching data being arranged in descending order.

3. A neural network system according to claim 2, wherein said neural network generates a plurality of output data, wherein each of said teaching data includes a plurality of bits, each of which is binary-value data and corresponds to each of the output of said neural network system, and wherein said configuring means determines a combination of neurons including a subneural network of said neural network in accordance with the number of transitions between binary values in each of a plurality of respective bits of said teaching data being arranged in descending order.

4. A neural network system according to claim 3, wherein said configuring means further comprises means for determining weights of synapses connected to the neurons of the configured neural network by learning, and means for determining an output function of the neurons based on the determined weights of the synapses.

5. A neural network system according to claim 2, wherein said configuring means includes:

means for representing a pattern of transitions between binary values in a sequence of said teaching data being arranged as a combination of AND or OR logical operations of fundamental patterns each thereof having one transition between two values, and means for configuring a combination of the neurons constituting the neural network to realize the AND or OR logical operations of the fundamental patterns by using the neurons.

6. A neural network system according to claim 5, wherein said neural network includes a first hidden layer and a second hidden layer, and when n (n>3) denotes a number of transitions between binary values in an arranged sequence of said teaching data, a number of neurons of said first hidden layer is n and a number m of neurons of said second hidden layer is given by $$m=(n/2)-(¼)\{1-(-1)^n\}.$$

7. A neural network system according to claim 5, wherein said configuring means further comprises:

means for determining weights of synapses connected to the neurons of said second hidden layer in accordance with the AND or OR logical operation; and means for determining an output function of a neuron based on the determined weights of synapses.

8. A neural network system according to claim 2, wherein said means for determining a sum of a plurality of input data includes means for multiplying a predetermined coefficient to the corresponding data of the data pattern set before the sum of the plurality of data for the data pattern set are determined.

9. A neural network system according to claim 1, wherein said network means includes means for generating a required amount of new data from existing input data when the amount of new data required by said neural network is not present and reducing the existing input data to the required amount of new input data when more than the amount of new data required by said neural network is present.

10. A neural network system according to claim 1, wherein said neural network includes means for executing an operation between $\epsilon$ and $(1-\epsilon)$ for the input data and finally outputting the operation result as data between 0 and 1.

11. A neural network system according to claim 1, wherein said configuring means comprises means for determining an optimum number of neurons and an optimum number of hidden layers based on a convergence rate of a neural network of different numbers of neurons and different number of hidden layers after a first predetermined number of times of learning.

12. A neural network system according to claim 1 wherein said configuring means further comprises means for storing data relating to each of a second predetermined number of times of learning until a third predetermined number of times of learning is completed or an error becomes smaller than a predetermined value.

13. A method for configuring a neural network, said method being executed by a computer system and comprising the steps of:
  determining a sum of a plurality of input data constituting a data pattern set which includes teaching data of binary value data, a plurality of sums of said input data being determined respectively for a plurality of data pattern sets;
  arranging the plurality of sums of said input data in descending order to obtain an arrangement of respective teaching data; and
  determining a configuration of a combination of neurons constituting said neural network in accordance with a number of transitions between binary values in a sequence of said plurality of teaching data arranged in descending order.

14. A method according to claim 13, wherein said step of determining the configuration of the neural network includes determining a combination of neurons including a subneural network of said neuron network in accordance with the number of transitions between the binary values in each of a plurality of respective bits of said teaching data arranged in descending order.

15. A method according to claim 13, wherein said step for determining a configuration of the neural network comprises:
  representing a pattern of transitions between binary values in a sequence of said teaching data being arranged as a combination of AND or OR logical operations of fundamental patterns each thereof having one transition between two values; and
  representing the AND or OR logical operations of the fundamental patterns by using the neurons.

16. A method according to claim 15, wherein said step for determining a configuration the neural network further comprises determining weights of synapses connected to the neurons in accordance with the AND or OR logical operations.

17. A method according to claim 13, wherein when n $(n \geq 3)$ denotes a number of transitions between binary values in an arranged sequence of the teaching data, a number of neurons of said first hidden layer is n and a number m of neurons of said second hidden layer is given by $$m = (n/2) - (1/4)\{1 - (-1)^n\}.$$

18. A method according to claim 13, wherein said step for determining a sum of said input data includes multiplying a predetermined coefficient to the corresponding data of the data pattern sets before the plurality of sums of said input data of the data pattern sets are determined.

19. A method for configuring a neural network according to claim 13 wherein the step of determining a configuration of a combination of neurons constituting the neural network includes the steps of:
  determining patterns of changes of the teaching data relating to each determined sum;
  expressing patterns of changes of the teaching data by utilizing at least one of logical AND or logical OR operations of basic patterns, each including a single change of the teaching data;
  configuring neurons of the neural network by using said at least one of the logical AND or logical OR operations.

20. A method according to claim 19, wherein said step for configuring the neural network includes:
  determining synapses to be connected to neurons of a first hidden layer and weights based on said at least one of the logical AND or logical OR operations; and
  determining synapses to be connected to neurons of a second hidden layer and weights based on said at least one of the logical AND or logical OR operations.

21. A method according to claim 13, wherein N=the number of times of change between the binary values of the plurality of rearranged teacher data, wherein said step of determining a configuration of the neural network based on the number of times of change between the values of the plurality of rearranged teacher data includes:
  providing the number of neurons which is the same as the number N of times to change to a first hidden layer;
  providing (N-1)/2 neurons where N is odd and N/2 neurons where N is even to a second hidden layer;
  connecting an input layer to the neurons of said first hidden layer to continuously supply data "1" to the neurons of said first hidden layer;
  connecting outputs of two neurons of said first hidden layer to input of each neuron of said second hidden layer to continuously supply data "1" to each neuron of said second hidden layer; and
  connecting an output of each neuron of said second hidden layer to an output layer where N is even and connecting the output of each neuron of said second hidden layer and the output of the remaining neuron of said first hidden layer where N is odd so that data "1" is continuously supplied to said output layer.

22. A method for configuring a neural network, said method being executed by a computer system and comprising the steps of:
  determining a sum of learning data for each of a plurality of learning cases;
  rearranging teaching data for the learning cases in descending order, all teaching data being binary-value data;

determining a number N of transitions between binary-values of the teaching data;

providing the number of neurons which is the same as the number N of transitions to a first hidden layer;

providing (N−1)/2 neurons where N is odd and N/2 neurons where N is even to a second hidden layer;

connecting an input layer to the neurons of said first hidden layer to continuously supply data "1" to the neurons of said first hidden layer;

connecting outputs of two neurons of said first hidden layer to input of each neuron of said second hidden layer to continuously supply data "1" to each neuron of said second hidden layer;

connecting an output of each neuron of said second hidden layer to an output layer where N is even and connecting the output of each neuron of said second hidden layer and the output of the remaining neuron of said first hidden layer where N is odd so that data "1" is continuously supplied to said output layer.

23. A diagnosis system using a neural network system, comprising:

sensor means including a plurality of sensors for sensing a plurality of states of an object;

network means including a neural network for outputting data for the object based on the sensed state of the object;

means for determining a sum of a plurality of input data constituting a data pattern set which is accompanied with teaching data, said means for determining a sum of a plurality of input data determines a plurality of sums of input data respectively for a plurality of data pattern sets;

means for arranging the plurality of sums of input data in descending order to obtain a sequence of a plurality of respective teaching data, the plurality of sums of input data arranged in descending order and the plurality of respective teaching data arranged in descending order being stored in table form;

means for inputting a plurality of newly input diagnosis data constituting a data pattern set having unknown teaching data;

means for determining a sum of the plurality of newly input diagnosis data;

means for determining nearest sums along the plurality of sums of input data in said table for the sum of said newly input diagnosis data; and means for determining teaching data for the plurality of newly input diagnosis data based on teaching data corresponding to the nearest sums in said table.

* * * * *